United States Patent Office 3,288,883
Patented Nov. 29, 1966

3,288,883
COPOLYMERS OF ALKYL ALPHA-HYDROXY-METHYL ACRYLATES AND OTHER UNSATURATED MONOMERS
Samuel C. Temin, Pittsburgh, and Melvin E. Baum and Edward H. Gleason, Monroeville, Pa., assignors to Koppers Company, Inc., a corporation of Delaware
No Drawing. Filed May 31, 1962, Ser. No. 198,716
8 Claims. (Cl. 260—836)

This invention relates to novel addition polymers having a plurality of carbalkoxy and hydroxymethyl groups. In one specific aspect, it relates to alpha-hydroxymethyl acrylate polymers and the method for preparing same. In another specific aspect, it relates to novel vinyl copolymers prepared from alpha-hydroxymethyl acrylate.

A new monomer, ethyl alpha-(hydroxymethyl)acrylate has now become available prepared according to the copending application of R. W. Rosenthal et al., now U.S. Patent No. 3,066,165, issued November 27, 1962. This monomer contains functional groups which permit the formation of both condensation and addition polymers. In our copending application, Serial No. 198,752, filed even date herewith, there are disclosed and claimed the novel condensation polymers. The present application is directed to the addition polymers, the preparation of which is illustrated by the following equation:

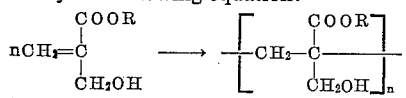

Recently considerable interest has been aroused in acrylate chemistry because of the versatility of acrylate monomers and polymers. Acrylate esters provide a series of monomers whose polymers vary from soft rubber-like material to hard plastics. These monomers can be used to modify the properties of copolymers and can also be used as intermediates in numerous chemical reactions.

The hydroxymethyl group of alkyl alpha-hydroxymethyl acrylate is attached to the polymer chain backbone through a non-hydrolyzable linkage. This makes the hydroxymethyl acrylate distinctly different from monomers having the hydroxyl group contained in the alcohol portion of the ester which may be removed from the polymer by hydrolysis. For example, hydrolysis of the ester group of alkyl alpha(hydroxymethyl)acrylate contained in a homopolymer or copolymer yields a unit containing both acid and alcohol groups, whereas the hydroxyalkyl acrylate type monomer unit yields only the acrylic acid type structure after removal by hydrolysis of the hydroxyalkyl substituent.

It is an object of our invention to prepare novel polymers having a plurality of carbalkoxy and hydroxymethyl groups. It is another object of our invention to insolubilize our novel polymers. It is a further object of our invention to react the monomers containing a plurality of carbalkoxy and hydroxymethyl groups with other monomers to produce copolymers and to insolubilize these copolymers.

In accordance with our invention, we have discovered novel vinyl polymers having a plurality of carbalkoxy and hydroxyymethyl groups of the formula

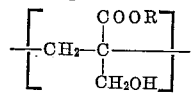

wherein R is a member of the group consisting of lower alkyl and hydrogen and a new method of making such vinyl polymers. The method comprises polymerizing an alpha-hydroxymethyl acrylate of the formula

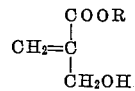

wherein R is lower alkyl in the presence of a catalyst. We have also discovered novel vinyl copolymers incorporating the vinyl monomer having a plurality of carbalkoxy and hydroxymethyl groups, and new methods of making such copolymers. These methods involve polymerizing a lower alkyl alpha-hydroxymethyl acrylate with a polymerizable vinyl monomer in the presence of a catalyst.

Polymerization may be performed in the absence or presence of a solvent or in aqueous systems. Bulk polymerization is an economical method of preparing the polymers. We have found that bulk polymerization of ethyl alpha-hydroxymethyl acrylate is readily accomplished. Solvent recovery problems are non-existent in this method and the capacity of a given size reactor is maximized in the bulk polymerization process. In an exothermic polymerization, the rate at which polymer may be prepared is somewhat limited because of poor heat dissipation in the high solid content mixture.

Solvents may be advantageously used to dissipate the heat of reaction. This introduces an added complexity since the solvent may now compete with monomer for growing chains. Such chain transfer reactions may lead to an undesirable reduction in the molecular weight of the polymer. Polymerization of ethyl alpha-hydroxymethyl acrylate in solvents such as toluene and methanol gives somewhat lower molecular weight products than in the bulk polymerization.

An efficient method of dissipating heat during polymerization is the use of bead or suspension polymerization in which monomer droplets are surrounded by a liquid medium, usually water. The mechanism of polymerization in the monomer droplet is essentially the same as occurs in bulk polymerization except that the surrounding aqueous phase readily dissipates the heat. In this method, polymer recovery is greatly enhanced if the polymer is insoluble in the water and is produced in a form that is easily separated from the water. In aqueous media, solid chunks of polymer are obtained except under certain specific conditions. These chunks are difficult to remove from the reaction vessel and are difficult to purify because of occluded impurities.

We have been able to obtain our novel polymers in the form of easily handled beads of more or less uniform size. We have also prepared the polymer in an aqueous system as a highly dispersed mixture of the polymer which can be used to give uniform coatings when applied to a surface.

It has now been demonstrated that under certain conditions a suspending agent, e.g., a polyacrylic acid, may be added to form small, easily handled polymeric beads. The addition of the suspending agent prevents the polymer from coalescing to form undesirably large particles, or remaining dispersed in the aqueous media from which it cannot be removed by filtration. Bead polymerization involves an aqueous dispersion of the monomer, a catalytic amount of an oil soluble catalyst (generally between 0.05–2.0 percent by weight, based on the weight of monomer) and a suspending agent, generally between 0.1–2.0 percent by weight, based on the weight of monomer. Useful oil soluble catalysts are azobisisobutyronitrile, benzoyl peroxide, di-t-butyl peroxide, cumene hydroperoxide, lauroyl peroxide and the like. Useful suspending agents are polymeric compositions containing a plurality of carboxyl functions or of partially neutralized carboxyl groups. Such compositions as polyacrylic acid, copolymers containing acrylic acid units, partially hydrolyzed polyacrylonitrile, partially hydrolyzed polyacrylates or polymethacrylates, hydrolyzed maleic anhydride copolymers and the like. A commercial suspending agent, Tamol 850, is a partially neutralized polyacrylic acid which has been found useful. The addition of a buffer such as disodium acid phosphate gives an increase in the yield and a higher molecular weight product. To prepare beads, the water to polymer ratio is between 1:1 to 5:1. When the ratio is above 5:1, a coalesced polymer is formed using oil soluble catalysts as defined above and when the ratio is below 1:1, the coalesced polymer is produced. Omission of the suspending agent causes the polymer to coalesce and no beads will form. Further substitution of a water soluble catalyst for an oil soluble catalyst produces only sticky polymers.

A latex of poly(ethyl alpha-hydroxymethyl acrylate) is obtained when a water soluble oxidation-reduction initiator system, as contrasted with an oil-soluble catalyst, is used in the presence of sufficient water to dissolve practically all of the monomer. Sufficient water to monomer ratio for latex formation is over about 5 to 1. When most of the monomer forms a second phase due to lack of sufficient water, the latex was not obtained. Useful soluble redox initiators are combinations of ferrous salt, amines of hydrazines with hydrogen peroxide; persulfates, thiosulfates, chlorites, hypochlorites, permanganates, periodates and chromates in combination with reducing agents such as sulfites, hydrosulfites and bisulfites. The concentration of oxidizing agent is between 0.01–2.0% and the concentration of reducing agent is between 0.005–1.0% based on the weight of the monomer.

The poly(alkyl alpha-hydroxymethyl acrylate) may be hydrolyzed to produce a polymer having free carboxyl and hydroxyl groups. The polymer may be hydrolyzed with a weak acid to compositions which contain pendant carbethoxy, carboxyl and hydroxyl groups by partial hydrolysis. Alkaline hydrolysis leads more easily to complete hydrolysis. However, by adjusting the strength of the alkali and time of hydrolysis, partial hydrolysis also occurs. Stronger bases or longer times lead to polymers with only pendant carboxyl and hydroxyl groups. Useful alkalis are sodium hydroxide, barium hydroxide, potassium hydroxide, calcium hydroxide and ammonium hydroxide. Hydrolysis under acidic conditions requires longer time, generally because of the insolubility of the intermediate hydrolysis products which are soluble in bases. The use of systems other than water, although less desirable because of increased cost, can be employed. Other media such as alcoholic or dilute alcoholic media may be used with bases soluble in such media.

In preparing insoluble polymers of the invention, the conditions and choice of cross-linking agents may vary widely. The polymer may be cross-linked thermally through the ester and hydroxymethyl groups by heating the polymer to a temperature of about 100 to 250° C.

The polymer may also be crosss-linked by using chemical cross-linking agents. These cross-linking agents are divided into two groups. One group reacts only through the ester functions, whereas the second group reacts only through the hydroxymethyl functions.

The cross-linking agents which react through the ester functions are compounds that contain at least two active equivalents per molecule which are located at different sites on the molecule, i.e., polyfunctional compounds containing a group reactive with the carbalkoxy group. These include the polyamines and the glycols.

Useful polyamines which are typical of such polyfunctional compounds are ethylenediamine, hexamethylenetetramine, phenylenediamine, N-aminopropylmorpholine, piperazine, xylylenediamine, 2,2-aminoethyl aminoethanol, polyglycolamine, triethylenetetramine, toluenediamine, diethylenetriamine, tetraethylene pentamine, pentaethylene hexamine, methyl amino propylamino and isopropyl amino propylamine. Useful for cross-linking are glycols of the formula:

wherein R is a member selected from the group consisting of alkylene of up to eight carbon atoms, cycloalkylene of 4–6 carbon atoms, phenylene and naphthalene, and $n$ is an integer having a value of 1–2; e.g., ethylene glycol, propylene glycol, hexamethylene glycol, neopentyl glycol, butenediol, hexafluoropentanediol, 1,4-bis(hydroxymethyl)cyclohexane, isopropylidenediphenol, 1,3-bis(hydroxymethyl)benzene.

The polymers may be further insolubilized by reactions through the hydroxymethyl groups. These cross-linking agents must contain at least two equivalents capable of reacting with the hydroxymethyl group. Useful difunctional compounds are diepoxides, dianhydrides, diisocyanates, alkoxymethyl melamines, N-hydroxymethyl ureas, dibasic acids, diacid halides, phosphoric dihalides, and disulfonyl halides. Useful dibasic acids, include, oxalic, glutaric, adipic, sebacic, maleic, fumaric, terephthalic, phthalic, isophthalic and perfluoroglutaric acid. Useful dianhydrides include pyromellitic anhydride, phthalic anhydride, maleic anhydride and the like. Useful diisocyanates are alkylene diisocyanates, including pentamethylene diisocyanate, hexamethylene diisocyanate, 1,4-cyclohexane dimethylenediisocyanate, decamethylene diisocyanate, and the like, and arylene diisocyanates, including 2,4-toluenediisocyanate, phenylene diisocyanates, 2,6-toluenediisocyanate, 1,5-naphthalenediisocyanate, 1-chlorophenylene-2,4-diisocyanate, 4,4'-dixylenediisocyanate, and the like. Useful alkoxymethyl melamines include trimethylol melamine, trimethoxymethyl melamine, tributoxymethyl melamine, hexamethylol melamine, hexamethoxymethyl melamine and hexabutoxymethyl melamine, dimethylolphenyl guanamine, tetramethoxymethyl. Useful N-hydroxymethyl ureas include monomethylol urea, dimethylol urea, methoxymethyl urea, butoxymethyl urea, dimethylol ethylene urea and methylol triazone. The monomethylol or alkoxymethyl derivatives require additional formaldehyde for cross-linking. Useful diacid halides include adipoyl chloride, sebacoyl chloride, phosgene, succinoyl bromide, phthaloyl chloride, isophthaloyl bromide, hexahydrophthaloyl chloride, norcamphoryl chloride, diphenoyl chloride, and fumaroyl chloride. One may also use polyacid halides if desirable. Useful phosphonic dihalides include benzene phosphonic dichloride, bromomethyl phosphonic dibromide, chlorobutyl phosphonic dichloride, 2-ethylhexyl phosphonic dichloride, iodomethylphosphonic diodide and ethylene bis (phosphonic dichloride). A similar useful dihalide is N,N-dimethyl phosphoramidic dichloride. Useful disulfonyl halides include meta-benzene disulfonyl chloride, 1,4-butane disulfonyl chloride, 1,4-cyclohexane disulfonyl chloride and the like.

The vinyl copolymers are prepared by polymerizing the lower alkyl alpha(hydroxymethyl)acrylate with a vinyl comonomer of the formula:

$$CH_2=CRR'$$

wherein R is a member selected from the group consisting of hydrogen, lower alkyl, vinyl, phenyl, lower alkylphenyl, cyano, carboxyl, carbalkoxy, carbamido and chlorine, and R' is methyl and hydrogen. Representative vinyl comonomers include methacrylic acid, methyl methacrylate, ethyl methacrylate, butyl methacrylate, hexyl methacrylate, lauryl methacrylate, dimethylaminoethyl methacrylate, acrylic acid, methyl acrylate, ethyl acrylate, butyl acrylate, 2-ethylhexyl acrylate, styrene, p-ethyl styrene, alpha-methyl styrene, ethylene, vinyl acetate, vinyl chloride, vinylidene chloride, acrylonitrile, methacrylonitrile, butadiene, isoprene and chloroprene. The term copolymers as used here also include compositions containing more than two monomers. These include terpolymers, such as acrylonitrile-styrene-ethyl alpha-hydroxymethyl acrylate, styrene-methacrylamide-ethyl alpha-hydroxymethyl acrylate, alpha-methyl styrene-acrylonitrile-ethyl alpha-hydroxymethyl acrylate, and the like. These copolymer compositions are useful in the preparation of thermoplastic molding materials and also in making extruded sheet and film or their foam counterparts.

The copolymerization with styrene may be represented by the following structure:

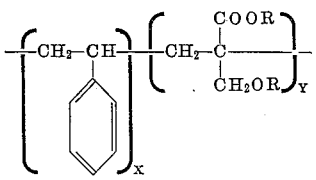

in which the monomer units most often alternate, but occasionally form small sequences in an entirely random manner. The copolymer composition depends on the monomer composition and it is useful to incorporate from 1–50% of the acrylate monomer in the copolymer composition. The presence of the hydroxyl group of the acrylate monomer transforms and modifies the properties of the copolymer. It changes the solubility to increase the hydrophilic properties, making the polymer more soluble in polar solvents and, conversely, less soluble in hydrocarbon solvents. It also affects the polymer surface properties whereby the polymer will be easily wetted by water and polar solvents or by any solvent in which hydrogen bonding is a factor. Further, the addition of the polar hydroxyl groups greatly increases the adhesive properties of the copolymer and also greatly reduces the electrostatic charge buildup.

The carbalkoxy and hydroxymethyl substituents are capable of undergoing intermolecular and intramolecular esterification to modify the polymer properties to a degree depending on the number of such groups contained in the copolymer and extent of subsequent esterification. Therefore, the hydroxymethyl group not only confers unique physical properties to the copolymer with which it is copolymerized, but it may be the locus of further chemical reactions to introduce still further new and unique properties on the polymer.

Copolymers of alkyl alpha(hydroxymethyl)acrylate are useful for numerous purposes. Small amounts of the acrylate copolymerized with styrene and other vinyl monomers gives a composition with considerably enhanced adhesion to paper and cellulosic materials and is therefore useful as a coating for such materials. As a constituent of a copolymer in a baked coating composition, the hydroxyl group may be reacted with epoxides, acids or isocyanates to modify the copolymer or with difunctional reagents as defined above under cross-linking of homopolymers, to introduce cross-linking and make tougher and harder film. Discoloration of molded styrene polymers due to heat of the molding cycle, or due to ageing and weathering, is considerably decreased by copolymerizing with small amounts of alkyl alpha(hydroxymethyl) acrylate. Small amounts copolymerized with styrene modify the solubility of plasticizers and blowing agents in the copolymer, such that compatibility with more polar plasticizers is possible or that more polar blowing agents may be easily incorporated into the copolymer.

Copolymers of alkyl alpha(hydroxymethyl)acrylate can be made by any of the usual systems of polymerization, bulk, solution, emulsion or suspension. Systems employing water as a second phase may require some modification in the preparation, since the acrylate monomer is soluble in water to an appreciable extent. In the extreme case where the acrylate is not soluble in the comonomer, it may be necessary to salt out the monomer from the water phase to the monomer phase for best results. To effect practical rates of polymerization, a free radical initiator as defined above in discussion of the homopolymer formation, in the range of 0.01 percent to 2 percent concentration based on the weight of the monomer is useful. The selection of initiator concentration is made on the basis of that amount which will give the maximum controllable rate of polymerization at a specified temperature to produce copolymers of useful molecular weight.

Since temperature usually has a larger effect on the rate at which the initiator decomposes and on the propagation of polymerization, it becomes necessary to choose initiators of the appropriate stability. Normally, this means an initiator having a half-life of approximately the same duration as the polymerization time. Free radical polymerization may be carried out at any temperature at which radicals can be produced in any sufficient quantity for an initiator to support a practical rate. In the case of thermal activation, this covers the range of about 30° C. to 150° C.

The mole ratio of alkyl alpha(hydroxymethyl)acrylate comonomer may assume any proportions but is determined by the ratio giving the desired copolymer composition. The composition of the copolymer, resulting from a given monomer feed ratio, may be determined from the copolymer parameters known as the reactivity ratios.

Copolymers containing from about 85 to about 60 percent styrene are especially useful in preparing insoluble coatings. For more flexible resin systems copolymers containing from about 75 to about 60 percent ethyl acrylate are advantageously employed.

The copolymers with acrylonitrile are of particular utility. Copolymers containing from about 85 to about 40 percent acrylonitrile give strong, clear, flexible films. The solubility of the copolymer approaches that of the homopolymer, poly(ethyl alpha-hydroxymethylacrylate), when the percent of acrylonitrile in the copolymer is less than about 65%. Thus, a 50:50 copolymer of an alkyl alpha(hydroxymethyl)acrylate and acrylonitrile is readily soluble in acetone. A clear tough film may be deposited from an acetone solution. The incorporation of minor amounts of ethyl alpha-hydroxymethyl acrylate in acrylonitrile copolymers is an extremely useful technique for preparing acrylic fibers of enhanced dyeability and water absorption with excellent physical properties. Thus, copolymers containing from about 2 to about 20% of an alkyl alpha-hydroxymethyl acrylate can be converted to fibers of great commercial potential. Compared to homopolyacrylonitrile fibers or polyacrylonitrile fibers containing from 2 to 20% methyl methacrylate, the polyacrylonitrile fibers containing minor amounts of an alkyl alpha-hydroxymethyl acrylate are much more receptive to commercial dyes, have much greater anti-static properties and have a higher moisture regain.

Cross-linking of the copolymer is effected employing the same techniques and using the same chemical cross-linking agents as described aforesaid in relation to cross-linking the homopolymers.

Our invention is further illustrated by the following examples:

Example 1

Under a nitrogen atmosphere, a mixture of 5.9 grams ethyl alpha-hydroxymethylacrylate, 12 ml. of water, 20 mg. of azobisisobutyronitrile, and 0.075 ml. of a polymer acrylic acid suspending agent was vigorously stirred, and the mixture was heated at 80–85° C. for four hours. The resultant polymer beads were removed by filtration. The polymer was washed numerous times with water and then dried in vacuo at 65° C. The weight of the homopolymer was 4.4 grams giving a 75% conversion. The inherent viscosity of the polymer, measured in dimethylformamide at 0.5% at 25° C., was 0.15.

Certain modifications of the procedure given above were attempted.

A. Addition of 60 mg. of disodium hydrogen phosphate dodecahydrate resulted in an 84% conversion to the bead polymer, having an inherent viscosity of 0.32 measured in a 0.5% solution of dimethylformadie at 25° C.

B. In the absence of a polymeric acrylic acid suspending agent, a coalesced polymer was formed and no beads were obtained.

C. Changing the ratio of ethyl alpha-hydroxymethylacrylate to water from 1:2 to 1:1 gave coalesced polymer and no beads.

D. Substitution of hydrogen peroxide for azobisisobutyronitrile produced only a sticky polymer and no beads.

Example II

A mixture of 5.1 grams of ethyl alpha(hydroxymethyl) acrylate and 50 ml. of water was stirred and purged with nitrogen for ten minutes. With continuous stirring and nitrogen bubbling throughout the entire reaction time, 5 ml. of a 2% solution of potassium persulfate and 2 ml. of a 1% solution of sodium bisulfite was then added, and the mixture heated at 25–40° C. for 1½ hours. Attempted separation of solids from the emulsion by filtration was unsuccessful. On standing for about a week, the latex gradually clarified so that the top portion became clear, which, on shaking, again dispersed through the whole mixture. An aliquot of the latex solution was treated with 10% sodium chloride to precipitate the polymer, which was then washed free of chloride ions with water and dried. The yield was 64% of polymer having an inherent viscosity of 0.34 measured in a 0.5% solution of dimethylformamide at 25° C.

Attempted repetition of the experiment substituting 20 ml. of water was unsuccessful, since a coalesced polymer was obtained, rather than the latex.

Example III

A. A mixture of 3.31 g. of ethyl alpha-hydroxymethylacrylate and 31.1 mg. of azobisisobutyronitrile was heated in a sealed evacuated tube at 65° C. for three hours. The polymer was precipitated with water from a dimethylformamide solution to give 2.82 grams, 85% conversion, of product with an inherent viscosity of 0.38.

B. In another experiment using a different catalyst, 6.6 grams of ethyl alpha-hydroxymethylacrylate and 7.3 mg. of benzoyl peroxide were heated at 60° C. for 15 hours in a sealed evacuated tube. The product obtained was 5.53 grams of polymer, 84.2% conversion, having an inherent viscosity of 0.57.

C. A tube containing 5.3 grams ethyl alpha-hydroxymethylacrylate was injected with 0.04 ml. of tri-isobutyl boron, shaken vigorously to disperse the catalyst, and cooled in a Dry Ice-carbon tetrachloride bath (−24°) for 16 hours. The polymer 3.5 grams (66%) was isolated by dissolving the reaction mass in dimethylformamide, and precipitating with water. The inherent viscosity, measured in a 0.5% solution in dimethylformamide at 25° C., was 0.90.

Example IV

A. A solution of 8.6 grams of ethyl alpha-hydroxymethylacrylate, 225 ml. of toluene and 31 mg. of azobisisobutyronitrile was heated under nitrogen at 90° C. for 8.5 hours. The solvent was decanted from the insoluble polymer. Purification from dimethylformamide gave 4.6 grams, 53.5% conversion, of polymer having an inherent viscosity of 0.11.

B. A solution of 8.5 grams ethyl alpha-hydroxymethylacrylate, 70 ml. of methanol and 10.2 mg. of azobisisobutyronitrile was refluxed for 3½ hours. An additional 10.2 mg. of the catalyst were added, and the refluxing continued an additional six hours. The polymer, 0.76 gram, 9% conversion, having an inherent viscosity of 0.14, was isolated by pouring the reaction mixture into water followed by filtration.

Example V

A. Under a reduced pressure of 3.5 mm. of mercury, 4.7 grams of poly(ethyl alpha-hydroxymethylacrylate) were heated at a temperature of 80–100° C. for three hours. The weight loss of the residue corresponded to 34% of the theoretical amount of ethanol which could be split out. The thermally cross-linked polymer was no longer soluble in dimethylformamide. After an additional 20 hours of heating at a temperature of 90–100° C. and a pressure of 3.5 mm. of mercury, the weight loss corresponded to 90% of the theoretical amount of ethanol.

B. Under a reduced pressure of 0.1 mm. of mercury, 8 grams of poly(ethyl alpha-hydroxymethylacrylate) were heated for 3⅓ hours at 80–215° C. in a small pot connected to a receiver cooled to −80° C. The distillate, 1.8 grams, was identified as ethanol by its infrared spectrum and refractive index. The residue was ground to a fine powder and heated at 180–200° C. under a pressure of 1.5 mm. of mercury an additional 1½ hours. The weight of the cross-linked polymer residue, 5.48 grams, corresponded to 106% of the theoretical amount, based on complete esterification.

Example VI

In a 200 ml. round bottom flask fitted with a stirrer, drying tube and a dropping funnel containing a solution of 6.5 grams (50 meq. ester groups) of poly(ethyl alpha-hydroxymethylacrylate) in 55 ml. of methanol was added a solution of 0.12 gram (5 meq. amino groups) ethylene diamine in 50 ml. methanol. The mixture became turbid and in less than one minute, a solid mass was formed. The insolubles were filtered and washed with methanol and then cured for several hours at 100° C. to give a hard, cross-linked polymer insoluble in dimethylformamide.

Example VII

In a stoppered flask protected from atmospheric moisture, was placed a 5% solution in dry dioxane of poly (ethyl alpha-hydroxymethylacrylate) (2.5 meq. of hydroxyl groups). A 10% solution in dry dioxane of adipyl chloride (1.1 meq. acid chloride groups) was added. The mixture required about five minutes heating on the steam bath to give an insoluble mass. The insolubles were removed from the liquor and cured further at about 100° C. to give insolubilized cross-linked product.

Similarly the homopolymer was cross-linked with hexamethylene diisocyanate in the presence of alpha-methylbenzyl dimethylamine.

Example VIII

A mixture of 1.9 grams of poly(ethyl alpha-hydroxymethylacrylate) and 15 ml., of 2 N sodium hydroxide was heated at 85° C. for ½ hour. The reaction mixture was centrifuged to move small amounts of gel and the clear supernatant liquid solution was added to 100 ml. of 18 N hydrochloric acid to precipitate the polymer. The solids were removed by filtration, washed well with water, and dried to give 0.95 gram of poly(ethyl alpha-hydroxymethyl acrylic acid), 82% of theoretical based on complete polymer hydrolysis. The inherent viscosity of the polymer, measured at 0.5% concentration in dimethylformamide at 25° C., was 1.03.

Example IX

To 1000 ml. of distilled water at 55° C. was added 4 grams of potassium persulfate, 2.5 grams of sodium bisulfite and 1.0 ml. of 6 N sulfuric acid. The solution was stirred for one minute and then a solution of 10 grams of ethyl alpha-hydroxymethylacrylate and 90 grams of acrylonitrile was added. Polymerization began almost immediately as indicated by formation of an insoluble, white polymer. The mixture was stirred for two hours while maintaining the temperature at above 55° C. by first cooling (during the initial exothermic reaction) and then warming. The mixture was then filtered and the fine beads of white copolymer were washed with water and then dried. The nitrogen content of the copolymer was 22.2% corresponding to a copolymer containing 85% by weight of acrylonitrile. The intrinsic viscosity of the polymer (0.5% solution in dimethylformamide at 25° C.) was 1.42. A film deposited from the solution was clear and flexible. The polymer could be spun into fibers by forcing a 15% by weight solution in dimethylformamide into a bath consisting essentially of 30% water and 70% dimethylformamide. Samples of these fibers after drawing, washing, and drying were compared with fibers composed of the homopolymer of acrylonitrile. Swatches of both fibers were dyed for thirty minutes at the boil using Alizarin Brilliant Blue R as dyestuff. The copolymer fibers were dark blue after soaping and washing, whereas the homopolymer fibers were a faint bluish tint.

*Example X*

A jacketed stainless steel reactor was connected to a compression pump. The pump was used to add ethylene containing 150 parts per million of oxygen and 0.05 mole of ethyl alpha-hydroxymethylacrylate per mole of ethylene. The pressure in the reactor was 28,000 p.s.i.g. at a temperature of 240° C. These conditions were maintained for a period of six hours while agitating the contents. After cooling and venting the excess ethylene, there was recovered from the reactor solid copolymer of density 0.933 in a yield of 21.5% based on the ethylene charged. The copolymer contained 12.8% ethyl alpha-hydroxymethylacrylate. In comparison to ethylene homopolymer, it was characterized by reduced stiffness (ASTM–D–747–48T), increased coefficient of friction and greatly increased adhesion. The copolymer in the form of film could be more readily printed and more readily heat-sealed than ethylene homopolymer.

*Example XI*

Ethyl alpha-hydroxymethylacrylate and styrene were copolymerized in bulk, without an initiator at a temperature of 100° C. The various compositions and reaction conditions are given in the table below.

*Example XII*

Ethyl alpha-hydroxymethylacrylate was copolymerized with acrylonitrile, alpha-methylstyrene and methacrylamide in the presence of 0.1% t-butyl perbenzoate. The first two were copolymerized with ethyl alpha-hydroxymethylacrylate in bulk, while the third required addition of an equal weight of dioxane/water (50/50) to dissolve the two monomers. Approximately 10 grams of comonomers were transferred to test tubes that could be degassed by vacuum while freezing out the monomers in liquid nitrogen. After freezing and thawing three times the tubes were sealed and placed in a thermostat at 100° C. On completion of the heating cycle the tubes were broken open and the polymers precipitated. Table II contains data for these copolymerizations: initial monomer concentrations, results of carbon or nitrogen analysis from which the composition of copolymer was calculated, conversion and a solvent-precipitant system for the copolymer.

TABLE II.—COPOLYMERS OF ETHYL ALPHA-HYDROXYMETHYL-ACRYLATE

|  | Acrylonitrile | alpha-Methylstyrene | Methacrylamide |
|---|---|---|---|
| Comonomer: |  |  |  |
|   Weight percent | 49.5 | 66.4 | 54.5 |
|   Mole percent | 70.0 | 70.0 | 70.0 |
| Hours heated | 4 | 24 | 4 |
| Percent Conversion | 21.7 | 13.3 | 28.3 |
| Analysis: |  |  |  |
|   Percent N | 8.4 |  | 8.4 |
|   Percent C |  | 70.9 |  |
| Comonomer in Copolymer: |  |  |  |
|   Weight percent | 31.8 | 42.9 | 50.9 |
|   Mole percent | 53.4 | 45.3 | 61.3 |
| Soluble in | Dioxane-Acetone | Benzene-acetone | Dioxane [1] |
| Precipitated in | Benzene | Petroleum ether | Methanol |

[1] Dispersible but soluble in dimethylformamide.

*Example XIII*

Styrene containing 20 mole percent ethyl alpha-hydroxymethylacrylate was copolymerized at varying rates of polymerization by the addition of varying amounts of t-butyl perbenzoate initiator at a temperature of 100° C. Copolymer composition at 10% conversion was about 73 mole percent styrene. The rate varied from 2 to 20 percent conversion per hour to give copolymers having viscosities in benzene which corresponded approximately to molecular weights of 180,000 to 60,000. This information is tabulated in Table III. The molecular weights are sufficiently high for uses requiring high molecular weight polymeric compounds of thermoplastic characteristics and the rates of copolymerization extend into the practical range.

TABLE I.—COPOLYMERIZATION OF STYRENE, $M_1$, WITH ETHYL ALPHA-HYDROXYMETHYLACRYLATE, $M_2$

| Expt. No. | Monomer Composition [a] | | | | Reaction Time, hours | Conv., Weight, percent | Copolymer Composition [a] | | |
|---|---|---|---|---|---|---|---|---|---|
|  | $(M_1)_0$ | $(M_2)_0$ | $(M_1)$ | $(M_2)$ |  |  | Percent C | $(M_1)$ | $(M_2)$ |
| 1 | 67.5 | 17.13 |  |  | 3.25 | 11.07 | 79.1 |  |  |
| 2 | 67.5 | 17.13 |  |  | 3.25 | 10.97 | 79.0 |  |  |
| 3 | 67.5 | 17.13 |  |  | 3.25 | 11.02 | 79.0 |  |  |
| Average [b] |  |  | 61.1 | 14.30 |  | 11.02 | 79.0 | 6.35 | 2.83 |
| Percent Avg. Dev. |  |  |  |  |  | 0.03 | 0.0 |  |  |
| 4 | 16.19 | 65.4 |  |  | 1.0 | 3.96 | 65.6 |  |  |
| 5 | 16.19 | 65.4 |  |  | 1.0 | 4.08 | 65.7 |  |  |
| 6 | 16.19 | 65.4 |  |  | 1.0 | 4.28 | 66.0 |  |  |
| Average [b] |  |  | 15.05 | 63.1 |  | 4.11 | 65.8 | 1.138 | 2.32 |
| Percent Avg. Dev. |  |  |  |  |  | 0.12 | 0.2 |  |  |

[a] In millimoles.
[b] Copolymer and final monomer compositions are calculated from average percent conversion and percent C since experiment was conducted in triplicate.

TABLE III.—COPOLYMERIZATION OF 80:20 STYRENE:ETHYL ALPHA HYDROXYMETHYLACRYLATE

| I [a] | Hours heated | Weight Percent [b] Conversion | Rate Percent/hr. | Intrinsic [c] Viscosity | Approximate M.W. ×10³ |
|---|---|---|---|---|---|
| 0 | 4.25 | 10.0 | 2.4 | 0.98 | 180 |
| 0.092 | 1.75 | 9.6 | 5.5 | 0.67 | 105 |
| 0.190 | 1.75 | 16.6 | 9.5 | 0.67 | 105 |
| 0.380 | 1.25 | 15.5 | 12.4 | 0.53 | 77 |
| 0.569 | 0.75 | 14.3 | 19.1 | 0.45 | 60 |

[a] Grams t-butyl perbenzoate per 100 grams monomer.
[b] At 10% conversion, copolymer is 67 wt. percent styrene.
[c] Determined in benzene, 30° C.

Example XIV

Two widely different compositions of styrene-ethyl alpha-hydroxymethylacrylate copolymer were prepared, molded and a Vicat softening point determined. Results are contained in Table IV. These two compositions have substantially the heat softening temperature of polystyrene regardless of the composition. Therefore, the ethyl alpha-hydroxymethylacrylate monomer units in the copolymer confer nearly the same heat-softening characteristics to the copolymer as styrene units.

TABLE IV.—COPOLYMERS OF STYRENE-ETHYL ALPHA HYDROXYMETHYLACRYLATE

| Weitht Percent Styrene in Monomer | Weight Percent Styrene in copolymer | Vicat Softening Temp. ° C. |
|---|---|---|
| 17 | 30 | 98.0 |
| 76 | 66 | 97.6 |
| 100 | 100 | ¹ 104 |

¹ Approximately.

Example XV

A 100 ml. resin pot was charged with 16.64 grams (0.15 m.) of styrene, 5.20 grams (0.04 m.) of ethyl alpha-hydroxymethylacrylate (80/20 mole ratio) and 33.0 grams of methyl ethyl ketone. A slow stream of nitrogen was passed through the solution, 52 mg. of benzoyl peroxide was added and the mixture was heated at 85° for 29 hours, while additional increments of benzoyl peroxide (50 mg., 100 mg., and 50 mg.) were added after 4, 7 and 22 hours. The total initiator used was 253 mg., 1.5 mmol (0.75 mole percent based on total monomer).

A sample was evaporated in vacuo to remove solvent and unreacted monomer. A 77% conversion of monomers was indicated to have been achieved by the weight of the residue. The solid contents of the polymer solution was 25% (weight to volume).

A. 5 ml. portion of the styrene-ethyl alpha-hydroxymethylacrylate copolymer solution, 0.8 gram toluene diisocyanate and 25 mg. of alpha-methylbenzyl dimethylamine was heated at 50° C. for two hours and then at 100° C. for one hour. The cured sample was insoluble in methanol, ethyl acetate and dimethylformamide after soaking overnight at room temperature. Omission of the catalyst gave a product partly soluble in dimethylformamide.

B. 5 ml. sample of styrene-ethyl alpha-hydroxymethylacrylate copolymer solution and 0.27 gram of pyromellitic diahydride was heated at 50° C. for six hours and 100° C. for 0.5 hour. The product was insoluble in methanol, ethyl acetate and dimethylformamide.

Using half the amount of the anhydride gave material which partly dissolves in ethyl acetate and is slightly swollen in dimethylformamide.

Example XVI

Following the procedure of Example XV, the reactor was charged with one-half of a mixture of 20.0 grams (0.20 m.) ethyl acrylate, 6.45 grams (0.05 m.) ethyl alpha-hydroxymethylacrylate, 263 mg. azobisisobutyronitrile and 40 grams of methyl ethyl ketone. The mixture was bubbled with nitrogen while heated at reflux for three hours. The second half of the above mixture was then added and refluxing under nitrogen continued for 18 hours. An additional 102 mg. of the initiator was added and reflux continued for five hours. Total catalyst added was 365 mg. By evaporation of a sample in vacuo, the indicated conversion was 88%. The solids content of the polymer solution is 34.3% (wt./vol.).

A. 5 ml. sample of the ethyl acrylate-ethyl alpha-hydroxymethylacrylate copolymer solution, 1.04 grams of toluene diisocyanate and 25 mg. of alpha-methylbenzyl dimethylamine were allowed to stand at room temperature for 16 hours and then at 100° C. for 0.5 hour. The hard flexible film was insoluble in methanol, ethyl acetate and dimethylformamide. Omission of the catalyst gave a soft, tacky film.

B. 5 ml. portion of ethyl acrylate-ethyl alpha-hydroxymethylacrylate copolymer solution, 0.60 gram of diglycidyl ether of 2,2-bis-(4'-hydroxyphenyl)propane and 24.8 mg. alpha-methylbenzyl dimethylamine were heated at 80–100° C. for 1.5 hours and then at 150° C. for 20 hours. The product did not dissolve in methanol, ethyl acetate and dimethylformamide.

Using lesser amounts of the diepoxide (½ and ¼) gave tacky and brittle or soft films compared to the hard film produced above.

Example XVII

A terpolymer of styrene, acrylamide and ethyl alpha-hydroxymethylacrylate in a weight ratio of 85:5:10, respectively, and 0.01 part by weight of azobisisobutyronitrile was heated at 65° C. for six hours in a sealed evacuated tube. Purification of the polymer was effected by addition of methanol to a benzene-acetone solution of the reaction mixture. The polymer had an inherent viscosity of 1.0 measured in a 0.5% solution in dimethylformamide at 25° C.

We claim:

1. A method of making a vinyl copolymer containing from 1–50 percent ethyl alpha-hydroxymethylacrylate comprising polymerizing said ethyl alpha-hydroxymethylacrylate with at least one vinyl comonomer of the formula:

$$CH_2=CRR'$$

wherein R is a member selected from the group consisting of hydrogen, lower alkyl, vinyl, phenyl, lower alkylphenyl, cyano, carboxyl, carbalkoxy, and carbamido and chlorine and R' is a member selected from the group consisting of methyl and hydrogen.

2. A vinyl copolymer consisting essentially of from 1–50 percent a lower alkyl alpha-hydroxymethylacrylate prepared by polymerizing said lower alkyl alpha-hydroxymethylacrylate with at least one vinyl comonomer of the formula:

$$CH_2=CRR'$$

wherein R is a member selected from the group consisting of hydrogen, lower alkyl, vinyl, phenyl, lower alkylphenyl, cyano, carboxyl, carbalkoxy, carbamido, and chlorine, and R' is a member selected from the group consisting of methyl and hydrogen.

3. A vinyl copolymer consisting essentially of from 1–50 percent ethyl alpha-hydroxymethylacrylate and from 50–99 percent of at least one vinyl comonomer of the formula:

$$CH_2=CRR'$$

wherein R is a member selected from the group consisting of hydrogen, lower alkyl, vinyl, phenyl, lower alkylphenyl, cyano, carboxyl, carbalkoxy, carbamido and chlorine and R' is a member selected from the group consisting of methyl and hydrogen.

4. A method of crosslinking the polymer of claim 2 through the —COOR group comprising reacting said polymer with a polyfunctional compound selected from the group consisting of polyamines and polyglycols.

5. A method of crosslinking the polymer of claim 2 through the hydroxymethyl group comprising reacting said polymer with a polyfunctional compound selected from the group consisting of diepoxides, dianhydrides, diisocyanates, alkoxy methyl melamines, hydroxymethyl melamines, N-alkoxymethylureas, N-hydroxymethylureas, diacid halides, phosphonic dihalides and disulfonyl halides.

6. A fiber forming vinyl copolymer of enhanced dyeability having an intrinsic viscosity of at least 1.0 in dimethylformamide at 25° C. consisting essentially of 2–20 percent lower alkyl alpha-hydroxymethylacrylate and 80–98 percent of acrylonitrile.

7. A method of making a polymeric composition comprising polymerizing a lower alkyl alpha-hydroxymethyl acrylate with at least one vinyl monomer of the formula: $CH_2=CRR'$ wherein R is a member selected from the group consisting of hydrogen, lower alkyl, vinyl, phenyl, lower alkyl phenyl, cyano, carboxyl, carbalkoxy, carbamido, and chlorine, and R' is a member selected from the group consisting of methyl, and hydrogen.

8. A vinyl copolymer comprising
   (a) an acrylic monomer selected from the group consisting of lower alkyl alpha-hydroxymethyl acrylate and alpha-hydroxymethyl acrylic acid, and
   (b) a vinyl monomer of the formula $CH_2=CRR'$ wherein R is a member selected from the group consisting of hydrogen, lower alkyl, vinyl, phenyl, lower alkyl phenyl, cyano, carboxyl, carbalkoxy, carbamido, and chloride, and R' is a member selected from the group consisting of methyl, and hydrogen.

References Cited by the Examiner
UNITED STATES PATENTS
3,066,165   11/1962   Rosenthal et al. _____ 260—484

MURRAY TILLMAN, *Primary Examiner.*

WILLIAM H. SHORT, *Examiner.*

J. NORRIS, W. J. BRIGGS, *Assistant Examiners.*